(12) United States Patent
Klann et al.

(10) Patent No.: US 9,212,905 B2
(45) Date of Patent: Dec. 15, 2015

(54) METHOD AND SYSTEM FOR DETERMINING RADIATION SHIELDING THICKNESS AND GAMMA-RAY ENERGY

(75) Inventors: Raymond T. Klann, Channahon, IL (US); Richard B. Vilim, Sugar Grove, IL (US); Sergio de la Barrera, Chicago, IL (US)

(73) Assignee: UChicago Argonne, LLC, Chicago, IL (US)

( * ) Notice: Subject to any disclaimer, the term of this patent is extended or adjusted under 35 U.S.C. 154(b) by 981 days.

(21) Appl. No.: 13/106,651

(22) Filed: May 12, 2011

(65) Prior Publication Data

US 2012/0116720 A1 May 10, 2012

Related U.S. Application Data

(60) Provisional application No. 61/412,267, filed on Nov. 10, 2010.

(51) Int. Cl.
  *G01B 15/02* (2006.01)
(52) U.S. Cl.
  CPC .................................... *G01B 15/02* (2013.01)
(58) Field of Classification Search
  USPC .......................................... 250/393, 394, 395
  See application file for complete search history.

(56) References Cited

U.S. PATENT DOCUMENTS

| | | | | |
|---|---|---|---|---|
| 3,257,558 A | * | 6/1966 | Cook et al. | 378/3 |
| 5,600,700 A | * | 2/1997 | Krug et al. | 378/57 |
| 7,148,483 B1 | * | 12/2006 | Testardi | 250/361 R |
| 7,317,195 B2 | * | 1/2008 | Eikman | 250/484.5 |
| 7,465,924 B1 | * | 12/2008 | Klann et al. | 250/336.1 |
| 2007/0034808 A1 | | 2/2007 | Evans | |
| 2007/0278423 A1 | * | 12/2007 | Eikman | 250/484.5 |
| 2008/0237485 A1 | * | 10/2008 | Beinhocker | 250/474.1 |
| 2008/0298545 A1 | * | 12/2008 | Bueno et al. | 378/57 |
| 2011/0063447 A1 | | 3/2011 | Vilim et al. | |
| 2011/0246137 A1 | | 10/2011 | Vilim et al. | |

FOREIGN PATENT DOCUMENTS

AU  B-630933/90  * 11/1992  ............. B29C 47/92

OTHER PUBLICATIONS

Vilim & Klann, "Radtrac: A system for detecting, localizing, and tracking radioactive sources in real time," Nuclear Technology, vol. 168, Oct. 2009, pp. 61-73.

* cited by examiner

*Primary Examiner* — Mischita Henson
*Assistant Examiner* — Lisa Peters
(74) *Attorney, Agent, or Firm* — Foley & Lardner LLP

(57) ABSTRACT

A system and method for determining the shielding thickness of a detected radiation source. The gamma ray spectrum of a radiation detector is utilized to estimate the shielding between the detector and the radiation source. The determination of the shielding may be used to adjust the information from known source-localization techniques to provide improved performance and accuracy of locating the source of radiation.

20 Claims, 14 Drawing Sheets

METHOD AND SYSTEM FOR DETERMINING RADIATION SHIELDING THICKNESS AND GAMMA-RAY ENERGY

CROSS REFERENCE TO RELATED PATENT APPLICATIONS

The present application claims priority to U.S. Provisional Patent Application No. 61/412,267, filed Nov. 10, 2010. The contents of this application are incorporated herein by reference in their entirety.

GOVERNMENT INTEREST

The United States Government has rights in this invention pursuant to Contract No. DE-AC02-06CH11357 between the United States Government and the UChicago Argonne, LLC, representing Argonne National Laboratory.

FIELD OF THE INVENTION

This invention pertains to radiation detection. More specifically this invention relates to determination of shielding thickness between a gamma-ray source and a detector.

BACKGROUND OF THE INVENTION

This section is intended to provide a background or context to the invention that is, inter alia, recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The need for accurate radiation surveillance is expanding as the perceived risk of unsecured nuclear materials entering and transmitting within the country increases. Tracking systems are required to detect, locate, and track a radiation source. Such a system is described in U.S. Pat. No. 7,465,924. After increased publicity of terrorist attacks there has been a fear that terrorists would carry a nuclear weapon or material into the US and cause catastrophic damage. One area of investigation has been on gamma radiation detection systems for shipping containers or trucks. This is a formidable task given the number of shipping containers, with the added consideration that the nuclear material/device may be in a shielded location. Some solutions have been developed; however, the detection equipment is not lightweight, nor easily portable, detection times are slow, and require essentially a stationary target. The concern is that a terrorist would carry a radioactive source and detonate it at a public event, such as a football game. Because a source would have to be carried to such an event, sensors placed outside the event or in a nearby subway/transit system could also provide an earlier detection method. In a crowded area, spectators provide shielding for the radioactive material in a nuclear device and make source detection difficult.

Current systems for detecting and tracking radioactive sources include a live video image of an area that includes the detected radioactive source. Further, current systems determine the most likely location of a radiation source. However, current systems lack the ability of determining the amount of shielding between the radiation source and a radiation detector. Current systems either make assumptions regarding the amount of shielding or ignore the impact of shielding.

Thus, there is a need for a source tracking system and methods for same which 1) determine the amount of shielding, 2) allow determination to be made in real-time, 3) allow for determination of the amount of shielding in a dynamic environment, and 4) rely on the spectral data from the source tracking system without the need for additional specialized detection equipment so that the source tracking system can more accurately predict the location of the source. These capabilities need to be provided in a way that maximizes the amount of data that the system can process.

SUMMARY OF THE INVENTION

One embodiment of the invention relates to a method of determining the shielding thickness for a radiation source using a plurality of distributed radiation detectors, a data collection and storage system in communication with the plurality of radiation detectors and a computer system in communication with the data storage and collection system, the computer system comprising a processor and a memory unit. The computer system includes instructions that when executed cause the system to: determine a background count; collect data for a gamma ray spectrum corresponding to each of the plurality of distributed radiation detectors for a predetermined time; normalize the collected gamma ray data; compute the signal as the difference between the background count and the normalized collected gamma ray data; calculate a signal-to-noise ratio using the computed signal; identify a portion of the spectrum corresponding to useful signal based upon the signal-to-noise ratio calculation; normalize the identified portion; compare the normalized identified portion to a predetermined reference; and compute for each of the plurality of distributed radiation detectors a shielding thickness between the radiation source and the respective detector. The system may further include further instructions to compute the location of the radiation source corrected for the computed shielding thickness. The computed location of the radiation source may be expressed in a graphical format, for example, a probability density plot.

In one embodiment, a method is provided for determining the shielding of a radiation source. The background count is determined. Data for a gamma ray spectrum corresponding to each of the plurality of distributed radiation detectors for a predetermined time is collected. The collected gamma ray data is normalized. The signal is computed as the difference between the background count and the normalized collected gamma ray data. A signal-to-noise ratio is calculated using the computed signal. A portion of the spectrum is identified as corresponding to a useful signal based upon the signal-to-noise ratio calculation. The identified portion is normalized. An offset between the normalized identified portion and a predetermined universal shielding curve is calculated. The shielding thickness between each detector and the radiation source is computed. The method may further include computing the location of the radiation source in view of the computed shielding thickness.

In one embodiment, a system is provided for determining the location of a shielded radiation source. The system includes a plurality of distributed radiation detectors. A data collection and storage system is provided in communication with the plurality of radiation detectors. A computer system in communication with the data storage and collection system is also included, the computer system comprising a processor and a memory unit. The computer system directs the system to: determine a background count; collect data for a gamma ray spectrum corresponding to each of the plurality of radiation detectors for a predetermined time; compute the signal as the difference between the background count and the normalized collected gamma ray data; calculate a signal-to-noise ratio using the computed signal; identify a portion of the spectrum corresponding to useful signal based upon the signal-to-noise ratio calculation; adjust the radiation counts by a correction factor; process radiation counts from each of the plurality of radiation detectors to determine a probability density function for the position of the shielded radiation source relative to the plurality of distributed radiation detectors; and output information indicative of the location of the shielded radiation source relative to the plurality of distributed radiation detectors.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIGS. 7A and 7B illustrates spectrum de-noising using $\alpha=1.414$ for: FIG. 7(a) 1 µCi $^{133}$Ba source with a computed cutoff energy of 440 keV, FIG. 7(b) 14 mCi $^{133}$Ba source with a high dead-time and an adjusted cutoff energy of 409 keV;

DETAILED DESCRIPTION OF THE PREFERRED EMBODIMENTS

Figure 1:
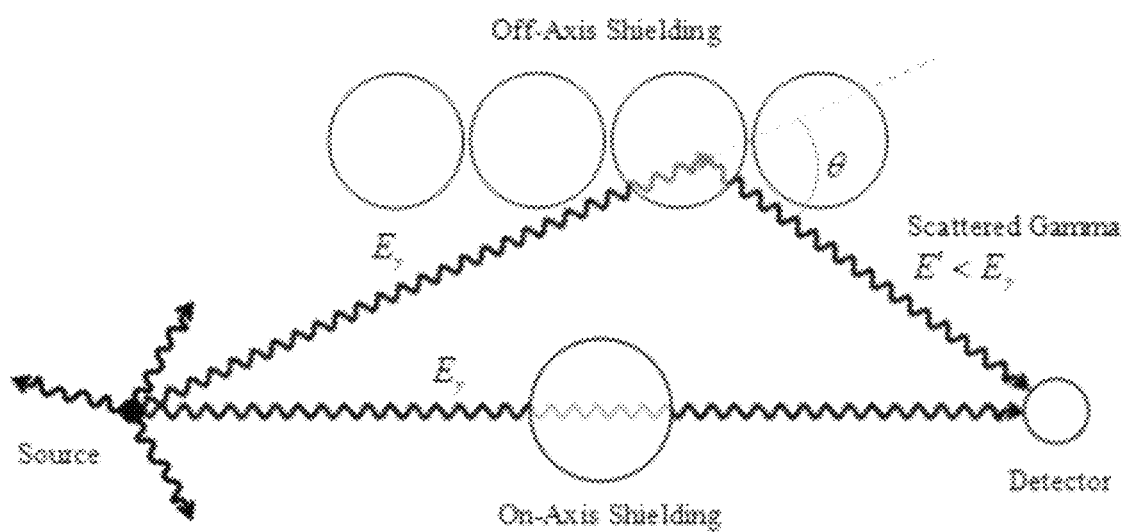
FIG. 1 illustrates Compton scattering in off-axis material.

In certain embodiments, the invention relates to a method and a system that utilizes data from an array of gamma-radiation detectors to track the movement of illicit radiological material in real-time while determining and accounting for shielding thickness between the radiation source and detectors. Radiation detectors for use with the present invention have been generally described in related applications; see, for example, U.S. Pat. No. 7,465,924, U.S. patent application Ser. No. 12/881,928, and U.S. patent application Ser. No. 12/881,943 each of which is incorporated herein by reference.

One embodiment of the detection system consists of gamma radiation detectors, networking for linking these detectors, signal processing algorithms, and a laptop for running the detection system, including the signal processing algorithms. The system is used to monitor an area and detect the presence of a radioactive source, to localize the position of the source, to track the movement of the source, and to identify the type of radioisotope. While numerous radiation detection systems are known, one embodiment of the invention uses a number of fixed detectors placed in any of a variety of configurations such as in a straight line, a square layout, or other non-linear layouts. The described method for real-time monitoring computes in essentially real-time the "crowd shielding" that occurs when a radioactive source moves through an environment, such as a crowd of people, that provides shielding and creates a probability map that indicates the most probable location of that source. A method is provided for determining a radioactive source (for example, but not limited to uranium, plutonium, cobalt, etc.) in a crowd and accounts for the reduction in gamma ray intensity by the crowd. The system and methods described further below may be used to correct for the attenuating and scattering effects of the phantoms. In one embodiment, the calculated position of the source may be accurate to within one foot of the actual location. In one embodiment, it may be assumed that each person standing between the source and a gamma ray detector decrease the gamma ray strength by approximately 50%. Thus, the gamma ray signal drops off quickly in a crowd within two or three people being "shields" (i.e. between the source and the detector); however, the gamma ray attenuation plateaus and sensor detection remains fairly constant due to scatter off of the crowd, in fact potentially as well as off of the floor. The method described herein calculates the source energy by integrating the signal-to-noise ratio (SNR) up to that energy beyond which no further signal is detected (cutoff energy).

In one embodiment, each detector has 1,024 channels which provide an energy spectrum to the shielding system, and once the cutoff energy has been determined, the number of channels drops to about 100-500. It should be appreciated by one of ordinary skill in the art, that the detector may have more or less than 1,024 channels and the actual number of channels prior to the cutoff energy may be more or less than 100-500. The gamma spectral data is compared with data in an existing library to identify the radiation source material. The probability map is updated, such as every second, with the data from the sensors being processed in about 0.1-0.2 seconds. In one embodiment, the system and method allows: 1) an accurate location of a radioactive source moving through a crowd can be determined in real-time, including the effects of "crowd shielding"; 2) similarly, the effects of other shielding components (concrete pillars, cars, etc.) are also dynamically considered; 3) any gamma ray detector may be used; 4) multiple detectors are required and may be placed in any configuration; and 5) a gamma ray spectrum library is available and provides identification of the source (uranium, plutonium, and other elements).

Certain embodiments exploit the relationships that exist among multiple detectors deployed in a known spatial configuration, the inherent sensitivity characteristics of the detectors, the properties of radioactive sources, and the correlation among signals from multiple detectors. This information is used to minimize the probability of false positives and the probability of a missed positive (false negative) and provides an advantage in tracking sources in environments where the signal-to-noise ratio is low and would otherwise result in requirements that run counter to goals of equipment portability and reasonable cost.

The system determines a probabilistic estimate of source position in real-time by combining measured count rates with known models of radiation transport. The relationship between measured count rate and source-to-detector distance is well understood in unshielded configurations, however, the physics of source detection and localization is more complex when shielding and/or scattering occurs, such in crowds of pedestrians. Moving crowds dynamically alter the shielding configuration, generating count rates that vary significantly with time. Thus, this must be accounted for dynamically in real-time in order to accurately perform source localization.

The attenuating effect of various infinite and semi-infinite shielding materials is well understood with a simple exponential model (Eq. 1) and with well-documented tables of attenuation coefficients.

$$\frac{C(x)}{C_0} = e^{-(\frac{\mu(E)}{\rho})\rho x} \quad (1)$$

Discrete or heterogeneous shielding, however, is much more difficult to characterize due to complex scattering interactions that occur within unevenly distributed matter. In many shielding situations, attenuation of direct radiation between the source and detector is the only radiation transport that is considered due to the fact that this tends to be the dominant effect. However, for non-uniform shielding material and non-homogeneous shielding, scattering phenomena from indirect radiation emissions must be considered as these quickly dominate direct attenuation effects for thick shadow-shielding cases. These gamma-rays are primarily a result of Compton scattering and affect detector gross count rates depending on the configuration of shielding material in the environment (see, e.g., FIG. 1). The energy of a gamma-ray scattered in a Compton interaction is given by the incident gamma energy and the scattering angle (Eq. 2).

$$E' = E(\theta) = \frac{E_\gamma}{1 + \frac{E_\gamma}{m_e c^2}(1 - \cos\theta)} \quad (2)$$

Figure 2:
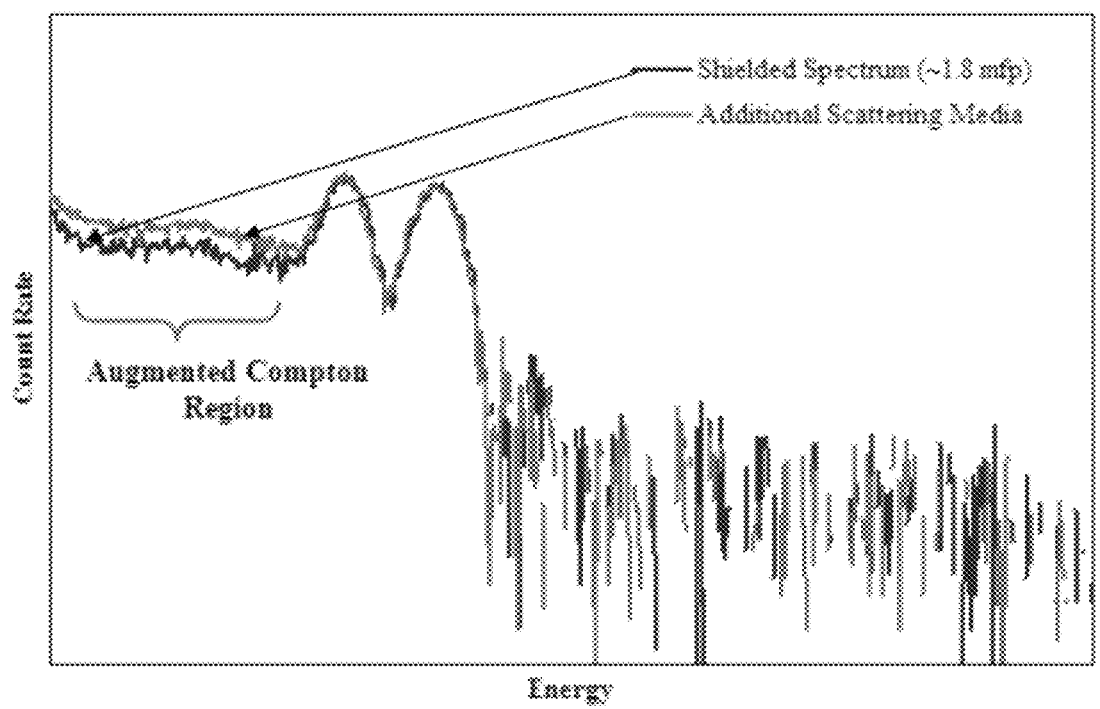
FIG. 2 illustrates augmentation of Compton continuum (NaI(Tl) spectrum) from scattering media outside of the direct path of radiation (Co-60)

It is clear from this relation that the scattered gamma-ray energy is always lower than that of the incident gamma ray. In a gamma energy spectrum these scattered gamma-rays raise the number of counts in the Compton continuum, the energy region resulting from scattered gamma-rays in the detector material (FIG. 2). FIG. 2 shows a case of two spectra collected from a $^{60}$Co source using a NaI(Tl) detector. The plot shows a spectrum collected with 1.8 mean free paths of shadow shielding between the source and the detector. The plot also shows a spectrum with the same shadow shielding plus additional material off-axis. The increase in the lower energy region below the photo peaks is the direct result of scattered gamma-rays from the additional material interacting with the detector.

As additional material is introduced, the Compton continuum becomes augmented to reflect the additional scattered gamma-rays. This augmentation is proportional to the amount of scattering media until the shielding becomes so dense that the material also significantly shields the secondary scattered photons.

Figure 14:
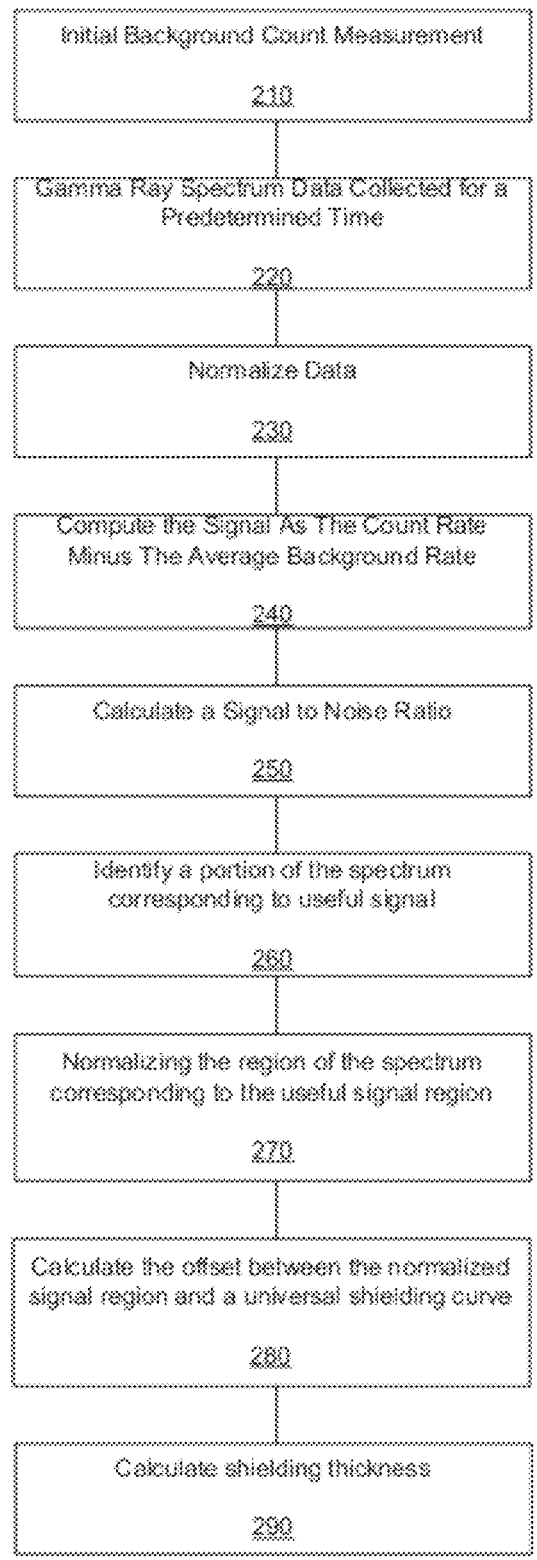
FIG. 14 is a flow chart illustrating the steps performed in one embodiment to determine the shielding between a detector and a radiation source.

A method of determining real-time shielding based on the shielding model previously described will now be described in detail. FIG. 14 illustrates a flow chart depicting the steps in one embodiment for determining the shielding between the radiation source and the detector. At step 210, an initial background measurement is performed to characterize the background count rate and the background rates in each channel of the spectrum (in one embodiment, 1024 channels for a standard NaI(Tl) detector). Thus, in one embodiment, the real-time shielding method uses the gamma-ray energy spectrum of each detector. At step 220, for a preset time interval (typically one second of real time), a gamma-ray spectrum is collected for each detector. At step 230, the spectra are normalized for live-time. This live-time normalization also accounts for incidents of significant dead-time and pulse pile-up. These phenomena occur when large (or exceptionally close) sources saturate the detector and cause reported count rates to be lower than actual rates of interaction in the detector in addition to generating false high-energy counts in the spectrum.

At step 240, the signal is computed for each channel in the spectrum as the count rate minus the average background rate. It should be appreciated that for small count times channels can be very noisy due to low statistics. Thus, in one embodiment, in order to smooth the data and reduce the noise, an uncertainty-based noise threshold may be used. The threshold is defined as $\alpha$. The count rate in a channel is defined as $$r = \frac{n}{t}$$

for n total counts in time t. The uncertainty on the channel count rate is then $$\sigma_r = \frac{\sigma_n}{t}.$$

The signal rate is given by the difference between total count rate and background count rate, $r_S = r_T - r_B$, and the uncertainty on the signal rate is, $$\sigma_S = \sqrt{\frac{n_T}{t_T^2} + \frac{n_B}{t_B^2}} = \sqrt{\frac{r_T}{t_T} + \frac{r_B}{t_B}} \quad (3)$$

In order to prevent noise from distorting the shielding determination, in one embodiment a noise filter is obtained by eliminating counts in a given channel that fall below a noise threshold described by a multiple of the uncertainty on signal, $\alpha$, as $$r_S \geq \alpha \sigma_s = \alpha \sqrt{\frac{r_T}{t_T} + \frac{r_B}{t_B}} = \alpha \sqrt{\frac{r_S + r_B}{t_T} + \frac{r_B}{t_B}} \qquad (4)$$

Solving this yields:

$$r_S \geq \frac{\alpha^2}{2}\left[\frac{1}{t_T} + \sqrt{\frac{1}{t_T^2} + \frac{4r_B}{\alpha^2}\left(\frac{1}{t_T} + \frac{1}{t_B}\right)}\right] \qquad (5)$$

For a time interval of one second $t_T=1$ and a sufficiently long background collection time $t_B \to \infty$, the equation reduces to:

$$r_S \geq \frac{\alpha^2}{2}\left(1 + \sqrt{1 + \frac{4r_B}{\alpha^2}}\right) \qquad (6)$$

Figure 6:
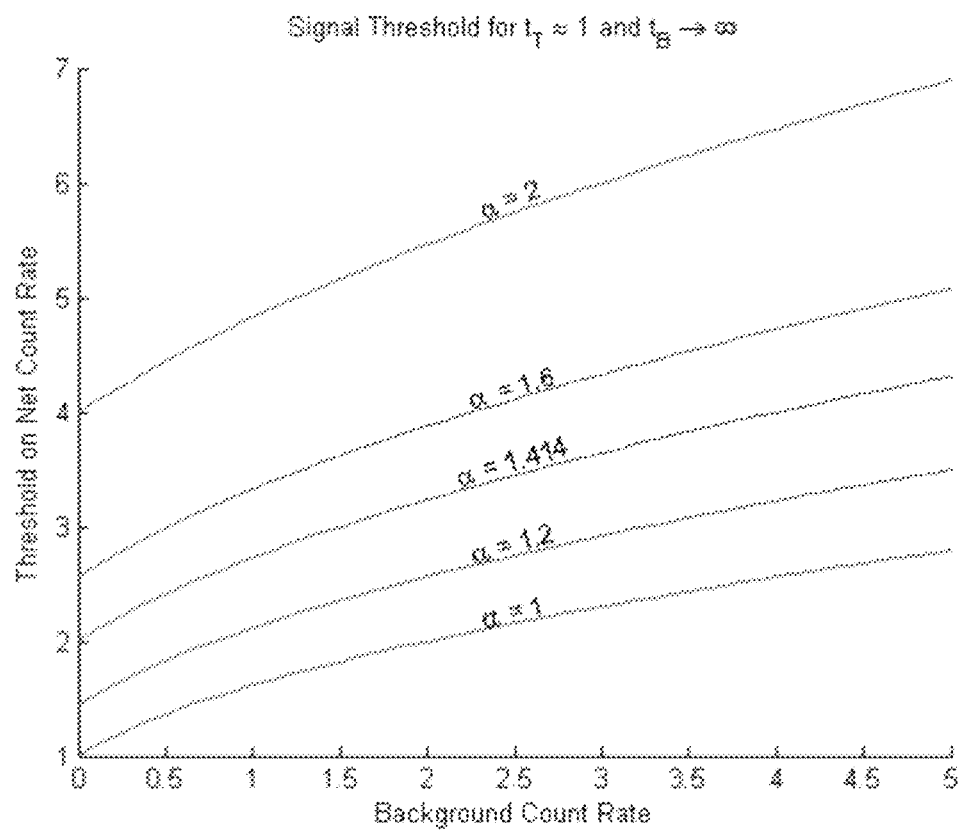
FIG. 6 illustrates a signal threshold for de-noising spectrum.
Figure 7A:
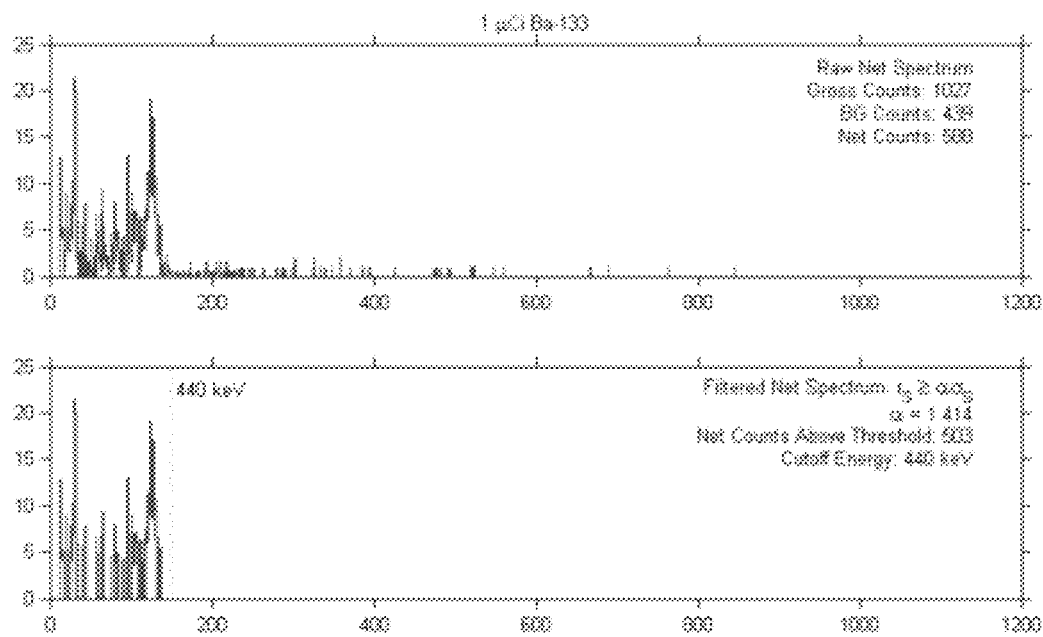
Figure 7B:
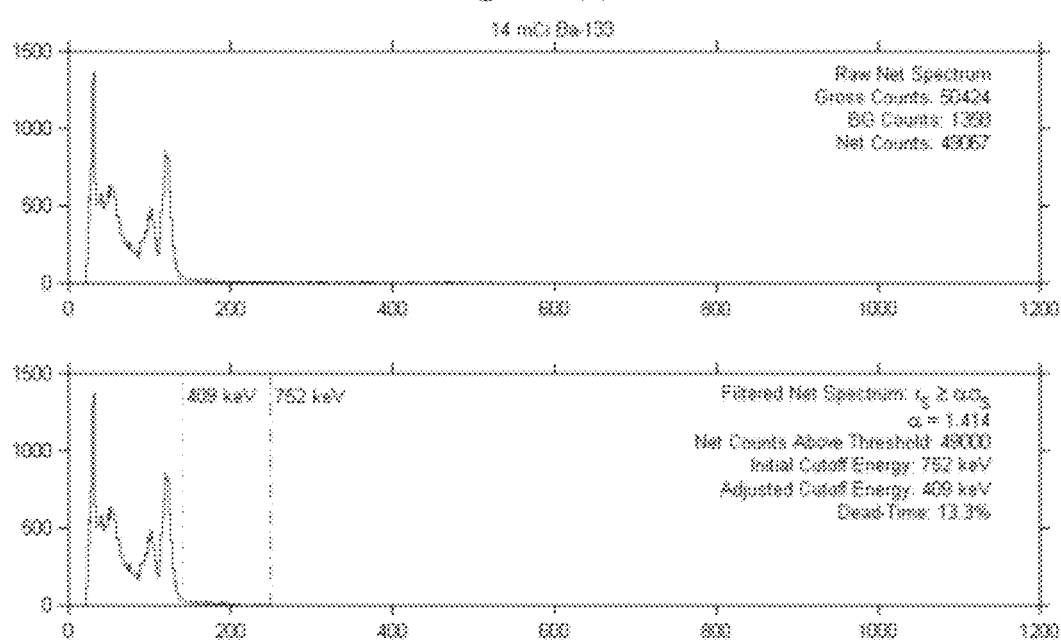

The threshold values on $r_S$ are shown as a function of the background count rate for different values of α in FIG. 6. FIGS. 7A and 7B show two examples of the de-noising of spectrum from $^{133}$Ba using α=1.414. In FIG. 7(a), a one second spectrum from a 1 μCi $^{133}$Ba source is shown before and after eliminating noise using this de-noising method. In FIG. 7(b), a 14 mCi $^{133}$Ba source with a high dead-time (13.3%) is shown. It is clear in both cases that the application of a noise filter causes a significant reduction in counts in the high energy region. If left in the spectrum, these counts would register as measureable signal. The inclusion of such noise as signal in the system may interfere with the calculation of signal-to-noise which in certain embodiments serves an integral to the determination of shielding.

At step 250, the signal-to-noise ratio (SNR) is determined. SNR is traditionally defined as:

$$SNR = \frac{T - B}{\sqrt{T + B}} \qquad (7)$$

In accordance with one embodiment, a cumulative signal-to-noise ratio is used for each detector:
(Eq. 8).

$$SNR_i = \frac{\frac{\sum T_i}{t_T} - \frac{\sum B_i}{t_B}}{\sqrt{\frac{\sum T_i}{t_T^2} + \frac{\sum B_i}{t_B^2}}} \qquad (8)$$

Figure 8:
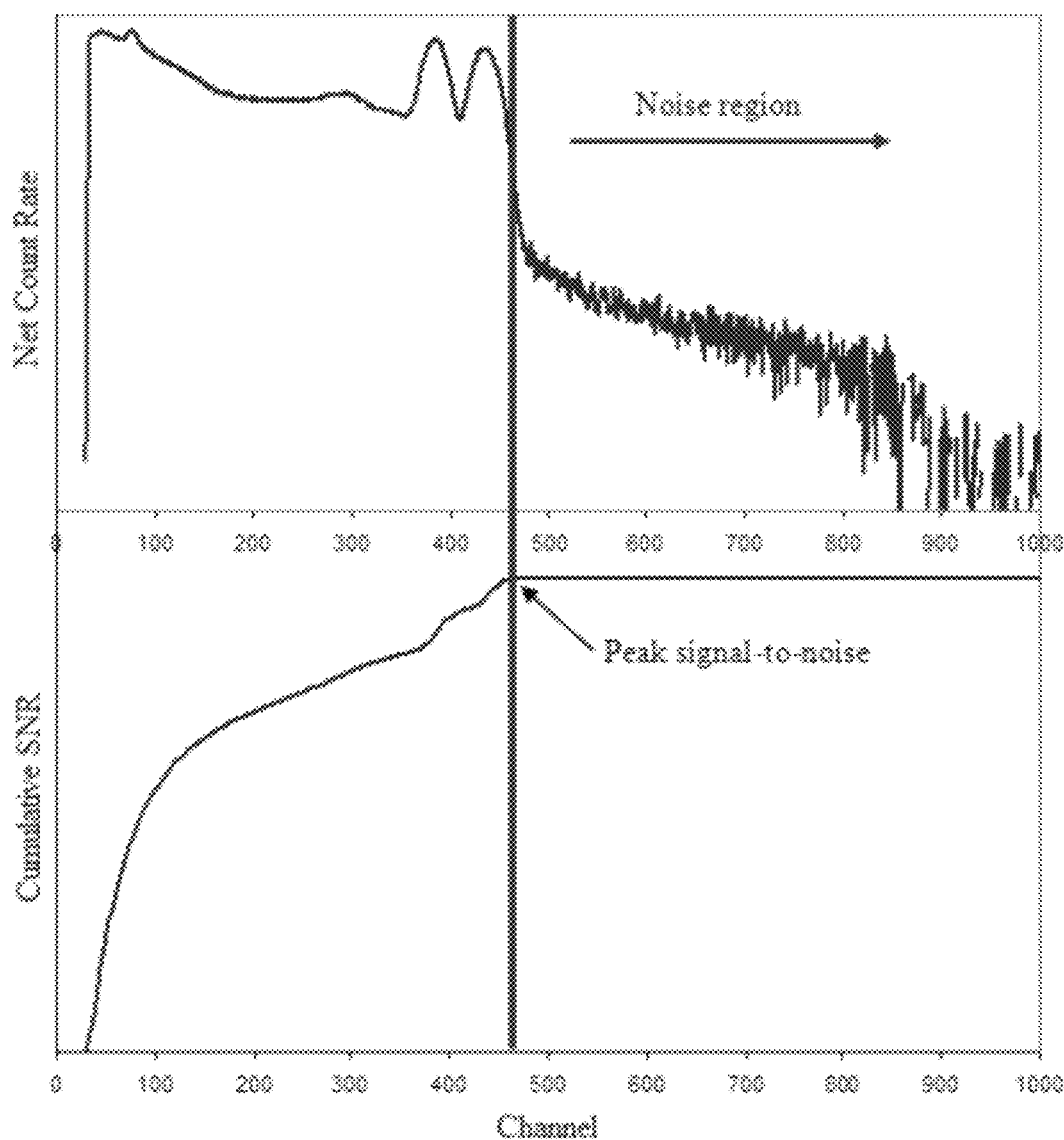
FIG. 8 illustrates the energy selection by peak cumulative signal-to-noise method.

This equation gives the cumulative signal-to-noise ratio at any channel i where $\Sigma T_i$ is the sum of gross counts by channel up to the $i^{th}$ channel, $t_T$ is the live time of the sample window, and $\Sigma B_i$ is the sum of counts by channel of the background spectrum with count time $t_B$. Once the $SNR_i$ values are calculated, in one embodiment, two or more channels may be grouped and their $SNR_i$ values summed. In an embodiment using a typical 1024-channel spectrum, the resulting $SNR_i$ values are grouped into 10-channel bins such that a typical 1024-channel spectrum would become 102 summed bins. This grouping into bins helps to smooth data for regions of the spectrum that still have low statistics. The bin with the maximum value of cumulative signal-to-noise ratio is determined. The channel number of the last channel in this bin is called the cutoff channel for the given detector and is used to approximate the maximum gamma ray energy from the radioactive source. The significance of this point is that the cumulative signal-to-noise ratio has peaked; the meaningful region of the spectrum has effectively ended and all counts above this point contribute only to the noise of the spectrum. FIG. 8 illustrates the cumulative SNR and the impact of noise above the cutoff channel. In one embodiment, an adjustment in the cutoff channel, called the adjusted cutoff, may also be made if a high dead-time is observed in the detector. The gamma-ray energy associated with the cutoff channel (the cutoff energy) is then used as the energy parameter in the shielding model.

Figure 9:
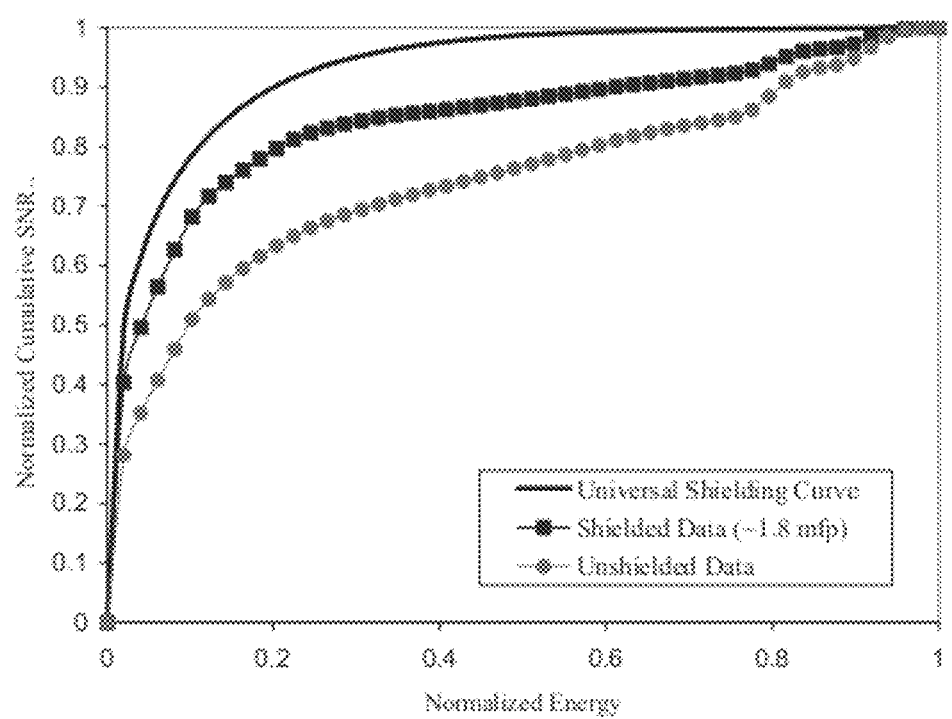
FIG. 9 illustrates normalized cumulative SNR data (Co-60) with corresponding energy-dependent universal shielding curve.

At step 260, the useful signal portion of the spectrum is determined. The shielding thickness parameter for the shielding model, x, is determined from the spectrum using the portion of the spectrum containing useful signal (i.e. all channels between the lower-level discriminator and the cutoff channel). Preferably, at step 270, this region is normalized using the value and channel of the peak cumulative signal-to-noise ratio as determined by the cutoff method such that both axes range from 0 to 1. FIG. 9 shows an example using $^{60}$Co with one plot (dot) for an unshielded source, one plot (square) with 1.8 mean free paths (mfp) of shielding, and a reference plot called the universal shielding curve. The universal shielding curve is an energy-dependent reference curve that describes heavily shielded spectra, obtained from an empirical fit of measured data as:

$$u(n,E) = (1 - e^{-a(E)*n})^{b(E)} \qquad (9)$$

where a(E) and b(E) are polynomial functions of energy and n is the normalized bin index. With reference to steps 280 and 290 of FIG. 14, the evaluation of the amount of shielding present in the data of each detector is determined by the offset between the normalized useful spectrum and the universal shielding curve (Eq. 9).

$$\text{offset} = \sum_n |u(n, E) - \text{normalized } SNR_n| \qquad (10)$$

The offset is inversely proportional to the number of mean free paths of shielding material. Thus, a large offset indicates a lightly shielded or unshielded configuration, while a small offset results from a heavily shielded configuration where the normalized spectrum resembles the smooth, featureless universal shielding curve typically with an augmented low-energy region compared to the universal shielding curve due to heightened scattering components.

In thick-shielding situations, significant material blocks the direct path of radiation between the source and the detector. This causes a reduction or loss of the photopeaks in the spectrum leading to a spectrum devoid of outstanding features. However, it is still possible to determine the primary gamma energy of a shielded source using the cumulative SNR method described above and estimate the quantity of shielding material between the source and detector by the shape of the spectrum. If there is measurable signal present in the spectrum, the method still determines an appropriate cutoff energy and an estimate of the amount of shielding present.

Figure 10:
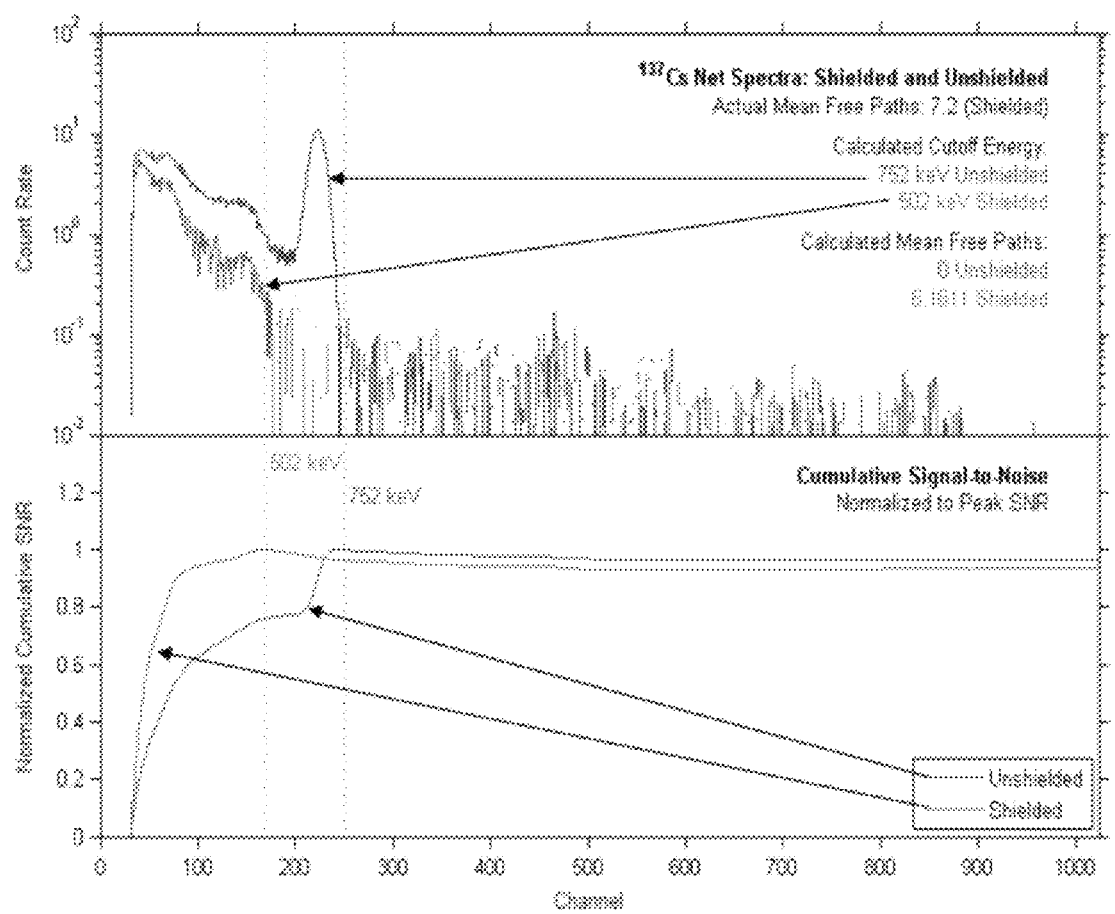
FIG. 10 is a comparison of cutoff energy and shielding thickness for unshielded and shielded $^{137}$Cs spectra.

FIG. 10 shows an example of the cutoff energy determination for an unshielded $^{137}$Cs source and a heavily shielded $^{137}$Cs source. The photopeak is easily observed for the unshielded source and the result generated by these methods is a cutoff energy of 752 keV and an estimated shielding thickness of 0 mean free path lengths (mfp). For the heavily shielded $^{137}$Cs source (shielding equal to 7.2 mfp), the spectrum is degraded and the photopeak is not clear. The cutoff energy is computed as 502 keV with the shielding thickness estimated to be 6.16 mfp. For the example illustrated in FIG. 10, the difference between the estimated 6.16 mfp and actual shielding thickness of 7.2 mfp is quantified by comparing the un-collided flux ratio $\phi/\phi_0$ of each using Eq. 11.

$$\frac{\varphi(r, E, x)}{\varphi_0} = [1 - s(r, E, x)]e^{-(\frac{\mu(E)}{\rho})\rho x} + s(r, E, x) \quad (11)$$

The reciprocal $(\phi/\phi_0)^{-1}$ is used as the correction factor for the net count rate. At a thickness of 6.16 mfp, the correction to the count rate compared to the true shielding of 7.2 mfp as determined by using Eq. 11 is:

$$(\varphi/\varphi_0)^{-1}_{mfp=6.16} = 3.091 \text{ and } (\varphi/\varphi_0)^{-1}_{mfp=7.2} = 3.150$$

The percent error of the correction factor $(\phi/\phi_0)^{-1}$ is only 1.85%. The difference in count rate adjustment between the calculated 6.16 mfp and true shielding thickness of 7.2 mfp is negligible when compared to the error that would be introduced if the shielding was not considered, i.e. with a shielding thickness of 0 mfp.

With an approximation of the primary gamma ray energy of the source and an estimate of instantaneous shielding thickness, a radiation detection system utilizing the methods described herein can adjust the measured count rates with the joint attenuation-scattering equation (Eq. 11). These adjusted count rates may then be utilized in the main tracking algorithm used for source localization. By adjusting the count rates to reflect the shielding thickness, the detection system provides a probability density map that can be used to determine the location of a source and track its position in the presence of time-varying shielding configurations. This approach has been demonstrated to be an effective first-order solution for use in real-time with low-resolution gamma-ray detectors, such as NaI(Tl), for a broad range of gamma ray sources and special nuclear material over a wide range of crowd densities.

Figure 3:
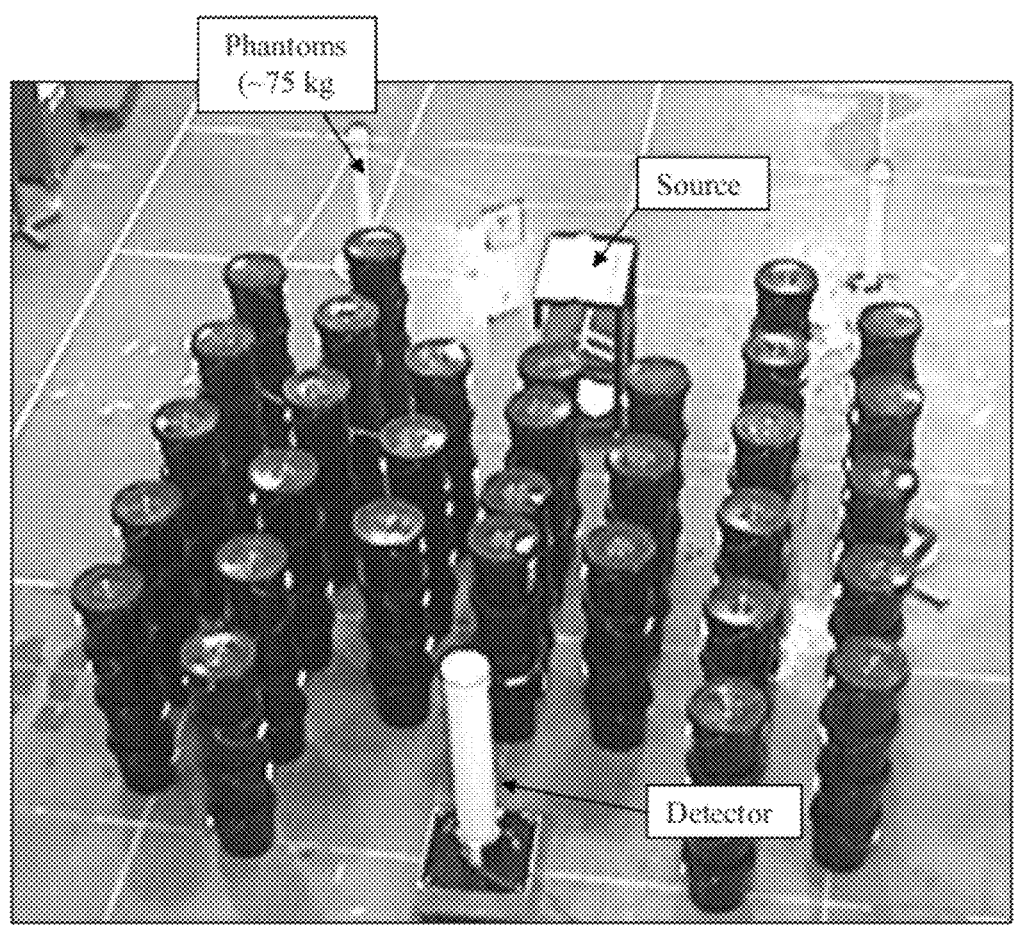
FIG. 3 illustrates one possible organization of a dense crowd of shielding phantoms.

Laboratory measurements were performed to examine the effect of shielding and scattering in situations with distributed heterogeneous shielding/scattering phantoms representative of individuals in a crowd. For purposes of testing, human-analog phantoms were created which consisted of approximately 75 kg of water contained in a stack of four sealed 5-gallon buckets directly on the floor or placed on a movers dolly (to make them easier to reposition in the laboratory). The phantoms mimicked an average person (167 pounds), with a diameter of approximately 11.5 inches, and a height of 5 to 5.5 feet. The water-based shielding phantoms were utilized in various geometric configurations to provide an understanding of crowd shielding scenarios encountered in the field (see FIG. 3 for an example of one configuration that was measured). The measurements were performed by varying the number of phantoms, the pitch of the phantoms, the spacing between the source and the detector, and the energy of the incident gamma rays. The configurations maintained a uniform average density in a heterogeneous configuration based on the pitch of the phantoms. Table 1 shows the net count rate for each of the configurations for three sources—$^{60}$Co, $^{137}$Cs, and $^{133}$Ba.

TABLE 1

Results of Shielding/Scattering Measurements

| | Net Count Rates | | | | | | Normalized | | | | |
|---|---|---|---|---|---|---|---|---|---|---|---|
| MFP | 10 ft | 20 ft | 30 ft | 40 ft | 50 ft | MFP | 10 ft | 20 ft | 30 ft | 40 ft | 50 ft |
| | Ba-133 | | | | | | Ba-133 | | | | |
| 0.00 | 189630 | 47385 | 21377 | 11956 | 7452.7 | 0.00 | 1.00 | 1.00 | 1.00 | 1.00 | 1.00 |
| 3.11 | 49253 | 17656 | 9061.8 | 5346 | 3421.5 | 3.11 | 0.26 | 0.37 | 0.42 | 0.45 | 0.46 |
| 6.22 | 40132 | 15182 | 7991 | 4817.7 | 3097.1 | 6.22 | 0.21 | 0.32 | 0.37 | 0.40 | 0.42 |
| 9.33 | 34994 | 14328 | 7644.6 | 4554.1 | 3001.8 | 9.33 | 0.18 | 0.30 | 0.36 | 0.38 | 0.40 |
| 12.45 | 31405 | 13434 | 7303 | 4393.5 | 2877.8 | 12.45 | 0.17 | 0.28 | 0.34 | 0.37 | 0.39 |
| 15.56 | | 12384 | 7078.4 | 4184 | 2753.5 | 15.56 | | 0.26 | 0.33 | 0.35 | 0.37 |
| 18.67 | | | 6234.9 | 4006.6 | 2644.9 | 18.67 | | | 0.29 | 0.34 | 0.35 |
| 24.89 | | | | 3397.9 | 2238.6 | 24.89 | | | | 0.28 | 0.30 |
| | Cs-137 | | | | | | Cs-137 | | | | |
| 0.00 | 2411.1 | 726.84 | 338.41 | 193.4 | 126.95 | 0.00 | 1.00 | 1.00 | 1.00 | 1.00 | 1.00 |
| 2.40 | 906.72 | 321.85 | 168.92 | 104.2 | 68.961 | 2.40 | 0.38 | 0.44 | 0.50 | 0.54 | 0.54 |
| 4.81 | 739.92 | 273.89 | 147.24 | 94.734 | 61.411 | 4.81 | 0.31 | 0.38 | 0.44 | 0.49 | 0.48 |
| 7.21 | 653.77 | 264.47 | 146.58 | 86.069 | 61.552 | 7.21 | 0.27 | 0.36 | 0.43 | 0.45 | 0.48 |
| 9.62 | 616.7 | 255.99 | 146.65 | 87.54 | 58.551 | 9.62 | 0.26 | 0.35 | 0.43 | 0.45 | 0.46 |
| 12.02 | | 245.25 | 143.98 | 85.186 | 54.932 | 12.02 | | 0.34 | 0.43 | 0.44 | 0.43 |
| 14.43 | | | 124.61 | 88.996 | 57.318 | 14.43 | | | 0.37 | 0.46 | 0.45 |
| 19.24 | | | | 85.013 | 41.992 | 19.24 | | | | 0.44 | 0.33 |
| | Co-60 | | | | | | Co-60 | | | | |
| 0.00 | 11268 | 3369.7 | 1595.4 | 919.08 | 583.75 | 0.00 | 1.00 | 1.00 | 1.00 | 1.00 | 1.00 |
| 1.79 | 5012.4 | 1697.9 | 877.61 | 519.44 | 334.5 | 1.79 | 0.44 | 0.50 | 0.55 | 0.57 | 0.57 |
| 3.58 | 3892.6 | 1340 | 712.83 | 439.91 | 280 | 3.58 | 0.35 | 0.40 | 0.45 | 0.48 | 0.48 |
| 5.36 | 3376.1 | 1260.4 | 683.72 | 405.93 | 269.15 | 5.36 | 0.30 | 0.37 | 0.43 | 0.44 | 0.46 |
| 7.15 | 3308.4 | 1248.8 | 665.48 | 396.62 | 262.47 | 7.15 | 0.29 | 0.37 | 0.42 | 0.43 | 0.45 |
| 8.94 | | 1232.7 | 659.38 | 392.9 | 254.09 | 8.94 | | 0.37 | 0.41 | 0.43 | 0.44 |
| 10.73 | | | 609.79 | 383.36 | 253.18 | 10.73 | | | 0.38 | 0.42 | 0.43 |
| 14.30 | | | | 355.12 | 221.16 | 14.30 | | | | 0.39 | 0.38 |

Figure 4:
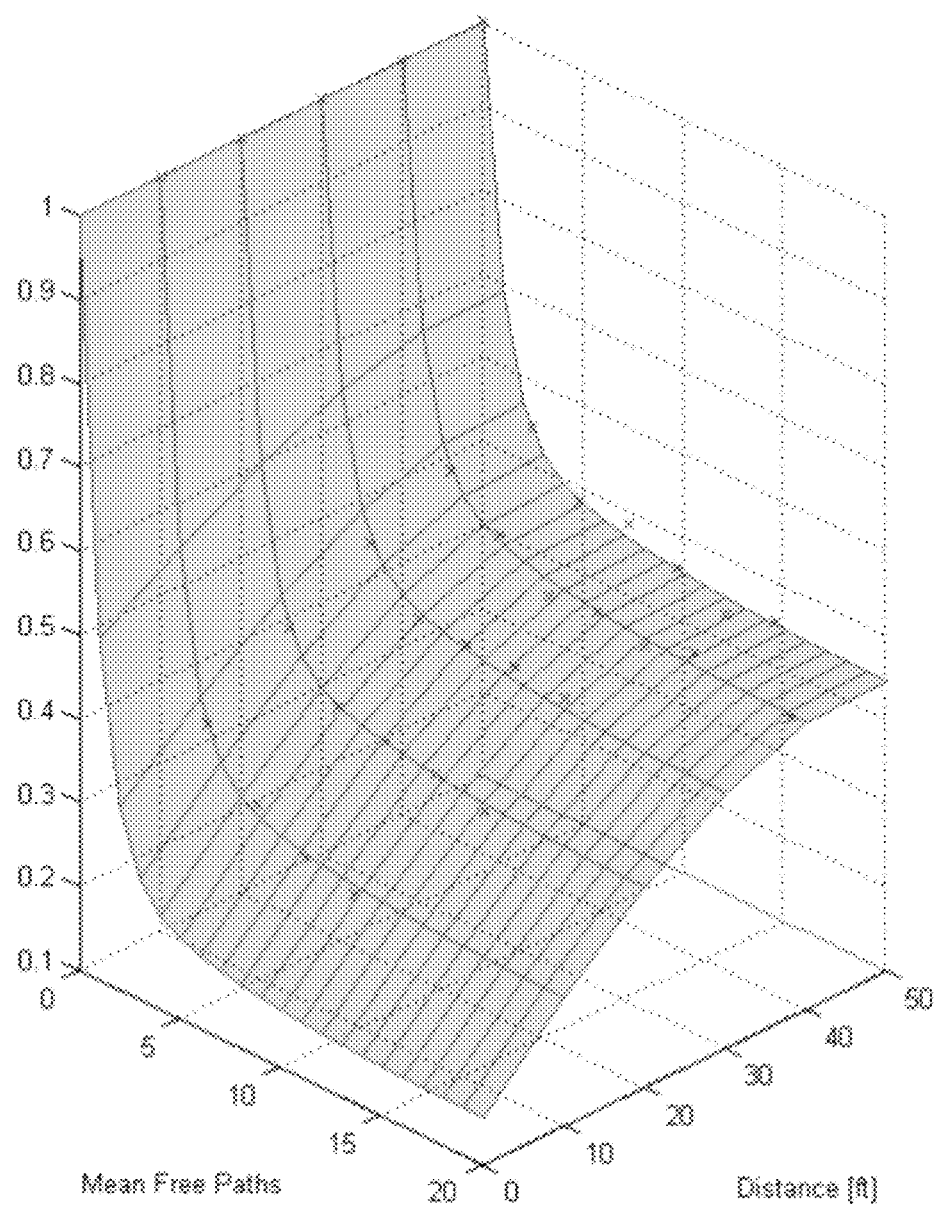
FIG. 4 illustrates relative net count rates for $^{60}$Co measurements.

FIG. 4 shows the data graphically for $^{60}$Co. Observe the large depreciation in the signal as a function of the number of mean free paths. Also note that there are differences in the response as a function of the distance, but the response is well-behaved and can be used for interpolation.

Figure 5:
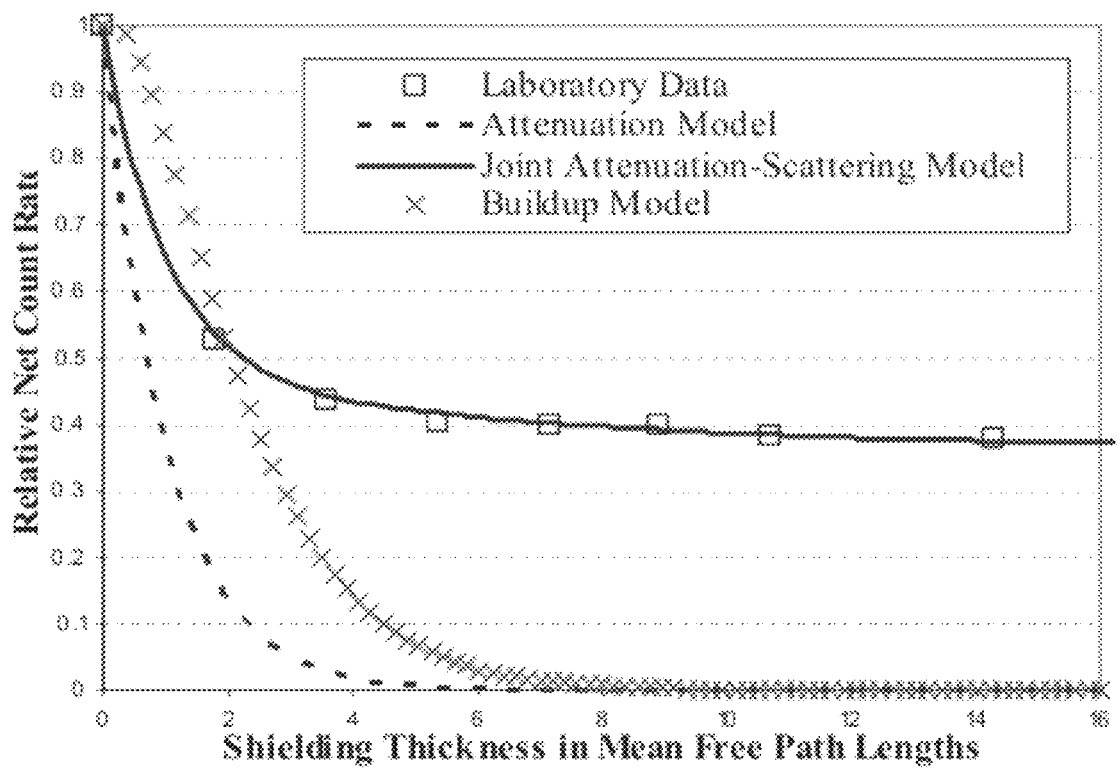
FIG. 5 Detector Response for $^{60}$Co Compared to Different Analytical Models (Buildup factors extracted from ANSI/ANS-6.4.3-1991)

The depreciation in the measured signal is expected, however, a surprising trend is observed in the data. FIG. 5 shows the results for $^{60}$Co at one distance. A fit to the data points is included along with a comparison to two analytical models. The basic analytical model of the attenuation with shielding thickness (from equation 1) is shown along with an analytical model that accounts for buildup. The model with buildup is:

$$\frac{C(x)}{C_0} = B(\mu x) e^{-(\frac{\mu(E)}{\rho})\rho x} \quad (12)$$

Buildup factors, $B(\mu x)$, were obtained using the mass attenuation coefficients for water. As can be seen in FIG. 5, neither model accurately represents the observed phenomena. The attenuation model severely under predicts the signal (net count rate). The buildup model over-predicts the signal for thin shielding and still severely under-predicts the signal for thicker shielding.

The differences between the models and the measured results for a crowd situation are, at least in part, the result of the deviation from the basic assumptions used in these models. Both of the theoretical models rely upon assumptions regarding uniformity of the shielding. However, in actuality, the shielding is not typically uniform, does not surround the source in all directions (or extend to essentially infinite lengths), and contains many streaming or scattering paths as a result of being made up of finitely-spaced heterogeneous bodies. Analyses of the measured spectra show a substantial scattering component that must be included to more accurately represent the observed radiation transport. A more sophisticated empirical model was created and may be represented by Eq. 11 presented above.

This model combines both attenuation and scattering phenomena to better predict the observed response of a detector system when used with a suitable scattering function, $s(r,E,x)$. This model provides more accurate shielding calculations for real-world situations than the prior art theoretical shielding models. The scattering function, $s(r,E,x)$, is derived empirically from laboratory data using uniform, heterogeneous shielding phantom arrangements as described previously. The source energy, crowd density, and source-to-detector distance were varied for each measurement and the three-dimensional scattering function was then fit to the measurement data.

With a known source-to-detector distance, r, an estimate of the major gamma energy, E, and an estimate of the instantaneous thickness of shielding (or crowd density), x, the algorithm can account for dynamic shielding in real-time.

Data was collected in several different locations to verify the validity of the shielding model and real-time shielding methods described above. The original data set used to develop the fits implemented in the current shielding methods (as seen in Table 1) made use of three sources with primary gamma-rays that cover a wide range of the gamma-ray energies that the detector system would be used to detect. To test the rigor of the data obtained from $^{60}$Co, $^{137}$Cs, and $^{133}$Ba, it was necessary to utilize a broad range of sources with varied peak energies and spectral features. A series of 5-minute dwell measurements were performed in order to accumulate data with high statistical certainty. These results are shown in Table 2, which gives a list of well-known sources with gamma peaks ranging from 40 keV to 1.4 MeV and with energy spectra characterized by both monoenergetic and polyenergetic photon emissions. Sources such as $^{54}$Mn, $^{137}$Cs, and $^{129}$I fall under the former classification while the rest of the sources in Table 2 fall into the latter (with $^{152}$Eu as an extreme example of a polyenergetic source).

TABLE 2

Calculated cutoff energies for various sources with 5 minutes of collected data
Calculated Cutoff Energies of Well-Known Sources

| Source | Activity | Shielding | Cutoff Channel | Cutoff Energy[a] | Highest Photopeak |
|---|---|---|---|---|---|
| Eu-152 | 1 µCi | none | 520 | 1592.6 | 1408 |
| Co-60 | 1 µCi | none | 480 | 1468.0 | 1332 |
| Na-22 | 1 µCi | none | 460 | 1405.7 | 1275 |
| Mn-54 | 1 µCi | none | 310 | 938.5 | 835 |
| Cs-137 | 1 µCi | none | 250 | 751.6 | 662 |
| *Pu-239 | | none | 170 | 502.4 | 414 |
| Np-237 | 10 µCi | none | 160 | 471.3 | 410 |
| Ba-133 | 1 µCi | none | 150 | 440.1 | 356 |
| U-235 | 80 g | none | 80 | 222.1 | 186 |
| U-235 | 80 g | 3.7 mfp | 80 | 222.1 | 186 |
| Co-57 | 1 µCi | none | 60 | 159.8 | 122 |
| Am-241 | 31 mCi | none | 50 | 128.6 | 103 |
| I-129 | 1 µCi | none | 30 | 66.3 | 40 |

[a]Cutoff energies typically fall 25 to 180 keV to the right of the known photopeak energies depending on the resolution of the detector
*Count time for this source was one minute There was no appreciable dead-time during these measurements and thus the adjusted cutoff channels are equal to the original cutoff channels determined by the peak cumulative signal-to-noise method described above. The cutoff energies are related to the cutoff channels according to the detector calibration, and it can be seen from Table 2 that each of these energies is slightly higher than the known photopeaks. The goal of the cutoff energy calculation is to capture the region of the spectrum with meaningful data, so it is important to retain the entire peak area (if there is a measurable peak). For this reason the cutoff energy will always fall just above the area of the peak.

Figure 11:
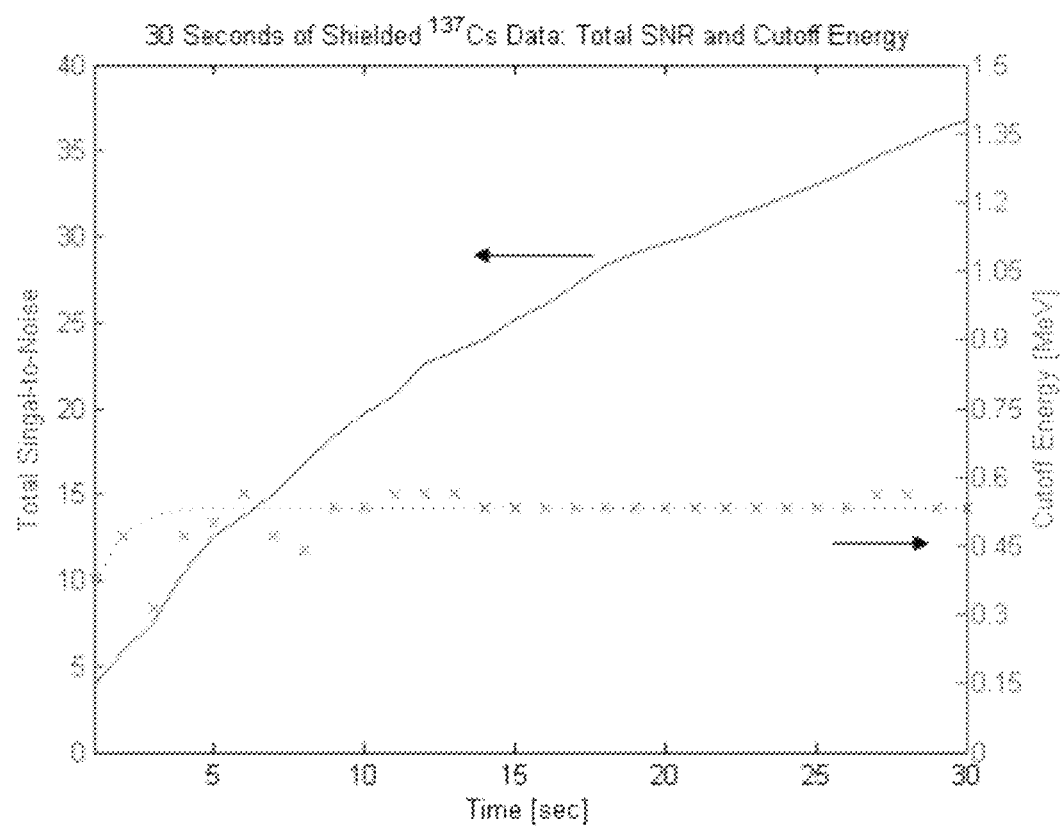
FIG. 11 illustrates the convergence of cutoff energy with increasing signal-to-noise ratio for a weak, shielded $^{137}$Cs source.

In real-time operation, the statistical certainty declines dramatically due to the short counting time and results are prone to the effects of statistical fluctuation. Thus, in certain embodiments, the uncertainty due to small sample sizes may be overcome by providing a determination in slightly less than real-time. In one embodiment the system is designed to accumulate data for a prescribed time interval, such as for one second per accumulation. In these conditions the limits of stability in a measurement were studied. This can be quantified by observing the fluctuations in a calculated value as a function of signal-to-noise ratio, a natural metric for statistical certainty. FIG. 11 displays the result of measuring a weak $^{137}$Cs source that has been shielded, reducing the overall SNR to 3.8. At this SNR level, the calculated cutoff energy is subject to a bit of fluctuation. The data in FIG. 11 are cumulative such that each channel in the spectrum is a running sum of the total in the channel. This method allows the total SNR to increase with each second, increasing the statistics as time proceeds. One can see in FIG. 11 that as time progresses the value of cutoff energy begins to converge and reach stability along with the increasing signal-to-noise.

The universal shielding model designed to give an estimate of effective shielding thickness has been subjected to a similar validation process. Data collected during long-dwell measurements of $^{60}$Co, $^{137}$Cs, and $^{133}$Ba in a variety of shielding configurations yielded mean free path estimations that are tabulated in Table 3. Actual shielding thicknesses are listed along with values of $\phi/\phi_0$ (using Eq. 11) for the estimated and actual cases for comparison. From FIGS. 4 and 5 one can see that as shielding material is introduced at a constant distance, the change in $\phi/\phi_0$ becomes decreasingly dependent on the thickness of shielding. The sensitivity of $\phi/\phi_0$ to fluctuations in mean free paths is important since the value of $\phi/\phi_0$ governs the final adjustment of the count rate to account for shielding. As is observed in FIGS. 4 and 5, once the shielding has reached approximately 5 mean free path lengths, the changes to $\phi/\phi_0$ are generally small and beyond the scope of a first-order correction. However, in the regime of 0 to 5 mean free path lengths it is especially important to accurately characterize shielding and reduce the impact of statistical fluctuation. Table 3 contains measurements that are meant to cover this range and establish an estimate of the error in final count rate that may be observed using these methods.

The difference in count rate caused by an error in mean free path estimate is given by:

$$\% \text{ error} = \frac{(\varphi/\varphi_0)^{-1}_{actual} - (\varphi/\varphi_0)^{-1}_{calculated}}{(\varphi/\varphi_0)^{-1}_{actual}} \times 100 \quad (15)$$

These errors are listed in the final column of Table 3. The positive and negative values of error are indicative of over-adjustment and under-adjustment of count rate, respectively. It is clear that the unshielded and lightly shielded cases are successfully being characterized by the method, but the error tends to grow as the thickness increases. Thus, the accuracy of the present method may decrease as thickness increases, particularly beyond 5 mfp.

Series of long-dwell measurements are useful for evaluating the mechanics of the shielding algorithm in a diagnostic manner. However, for a real-time system, real-time data to support the validation is essential. Thus, a series of 30 one-second calculations based on real-time data is given in Table 4 for a 14 mCi $^{133}$Ba source obscured by 3.11 mfp of shielding material, i.e., the shielding was held relatively static throughout the test. Being a relatively low-energy source, $^{133}$Ba does not produce any obvious peaks when measured with this level of shielding. This causes a slightly lower cutoff energy than would be expected for an unshielded $^{133}$Ba source, with its most prominent energy contribution coming from a 356 keV gamma peak (and to a lesser extent, a nearby 303 keV peak). In either case the universal shielding method described above estimates an appropriate level of shielding from the shielded spectrum with very little fluctuation. The stability of the shielding calculation is apparent in the small standard deviation of 0.09 in mean free paths and only 0.004 in $\phi/\phi_0$, which amounts to a 1.1% standard deviation from the mean adjustment on count rate (using Eq. 13).

TABLE 3

Mean free path estimates for long-dwell measurements of $^{137}$Cs, $^{60}$Co, and $^{133}$Ba in various shielding configurations.

Mean Free Path Calculations

| Source | Activity | Distance | True Mfp | True $\phi/\phi_0$ | Calculated Mfp | Calculated $\phi/\phi_0$ | $\Delta(\phi/\phi_0)$ | % Error |
|---|---|---|---|---|---|---|---|---|
| Cs-137 | 300 µCi | 20 ft | 0.00 | 1.000 | 0.00 | 1.000 | 0.000 | 0.00% |
| Cs-137 | 300 µCi | 20 ft | 2.40 | 0.411 | 3.31 | 0.371 | 0.040 | −10.92% |
| Cs-137 | 300 µCi | 20 ft | 4.81 | 0.334 | 5.34 | 0.329 | 0.005 | −1.46% |
| Cs-137 | 300 µCi | 20 ft | 7.21 | 0.319 | 5.51 | 0.328 | −0.009 | 2.65% |
| Cs-137 | 300 µCi | 20 ft | 9.62 | 0.307 | 4.84 | 0.335 | −0.028 | 8.40% |
| Co-60 | 1 mCi | 30 ft | 0.00 | 1.000 | 0.00 | 1.000 | 0.000 | 0.00% |
| Co-60 | 1 mCi | 30 ft | 1.79 | 0.523 | 1.82 | 0.520 | 0.003 | −0.57% |
| Co-60 | 1 mCi | 30 ft | 3.58 | 0.436 | 6.85 | 0.410 | 0.026 | −6.35% |
| Co-60 | 1 mCi | 30 ft | 5.36 | 0.393 | 7.44 | 0.383 | 0.011 | −2.86% |
| Co-60 | 1 mCi | 30 ft | 7.15 | 0.382 | 7.04 | 0.383 | −0.001 | 0.13% |
| Ba-133 | 14 mCi | 40 ft | 0.00 | 1.000 | 0.00 | 1.000 | 0.000 | 0.00% |
| Ba-133 | 14 mCi | 40 ft | 3.11 | 0.438 | 3.34 | 0.432 | 0.006 | −1.50% |
| Ba-133 | 14 mCi | 40 ft | 6.22 | 0.396 | 3.90 | 0.419 | −0.022 | 5.35% |
| Ba-133 | 14 mCi | 40 ft | 9.33 | 0.380 | 4.19 | 0.414 | −0.035 | 8.35% |
| Ba-133 | 14 mCi | 40 ft | 12.45 | 0.364 | 4.41 | 0.411 | −0.047 | 11.50% |
| Pu-239 | | 4 m | 0.00 | 1.000 | 0.00 | 1.000 | 0.000 | 0.00% |
| U-235 | 80 g | 10 ft | 0.00 | 1.000 | 0.00 | 1.000 | 0.000 | 0.00% |
| U-235 | 80 g | 10 ft | 3.70 | 0.300 | 4.50 | 0.283 | 0.017 | −6.04% |

TABLE 4

Results for 30 one-second spectra from a shielded 14 mCi $^{133}$Ba source
$^{133}$Ba (14 mCi)
Distance: 22.4 ft
Actual Shielding: 3.11 mfp
Actual $\phi/\phi_0$: 0.368

| Time | Gross CR | Net CR | Cutoff Energy | Mfp | $\phi/\phi_0$ |
|---|---|---|---|---|---|
| 1 | 18007 | 16722 | 409 | 3.09 | 0.372 |
| 2 | 18527 | 17242 | 316 | 3.30 | 0.361 |
| 3 | 18503 | 17218 | 316 | 3.30 | 0.361 |
| 4 | 18299 | 17014 | 316 | 3.43 | 0.357 |
| 5 | 18372 | 17086 | 347 | 3.29 | 0.363 |
| 6 | 18422 | 17136 | 316 | 3.39 | 0.358 |
| 7 | 18620 | 17335 | 316 | 3.29 | 0.361 |
| 8 | 18698 | 17413 | 284 | 3.04 | 0.368 |
| 9 | 18123 | 16838 | 347 | 3.12 | 0.368 |
| 10 | 18330 | 17044 | 316 | 3.26 | 0.362 |
| 11 | 18463 | 17177 | 316 | 3.28 | 0.361 |
| 12 | 18367 | 17082 | 347 | 3.16 | 0.367 |
| 13 | 18805 | 17519 | 316 | 3.28 | 0.361 |
| 14 | 18550 | 17265 | 347 | 3.15 | 0.367 |
| 15 | 18376 | 17091 | 347 | 3.20 | 0.365 |
| 16 | 18642 | 17357 | 347 | 3.26 | 0.364 |
| 17 | 18315 | 17030 | 316 | 3.27 | 0.362 |
| 18 | 18574 | 17289 | 316 | 3.34 | 0.360 |
| 19 | 18284 | 16999 | 409 | 3.18 | 0.369 |
| 20 | 18399 | 17114 | 347 | 3.20 | 0.365 |
| 21 | 18730 | 17444 | 347 | 3.25 | 0.364 |
| 22 | 18415 | 17130 | 316 | 3.29 | 0.361 |
| 23 | 18460 | 17175 | 347 | 3.23 | 0.364 |
| 24 | 18513 | 17227 | 347 | 3.16 | 0.367 |
| 25 | 18464 | 17178 | 316 | 3.32 | 0.360 |
| 26 | 18263 | 16977 | 347 | 3.15 | 0.367 |
| 27 | 18295 | 17010 | 347 | 3.16 | 0.367 |
| 28 | 18255 | 16969 | 347 | 3.12 | 0.368 |
| 29 | 18342 | 17057 | 316 | 3.13 | 0.366 |
| 30 | 18636 | 17351 | 347 | 3.09 | 0.369 |
| Mean | 18434.9 | 17149.7 | 335.2 | 3.22 | 0.364 |
| σ | 177.7 | 177.7 | 26.5 | 0.09 | 0.004 |

Table 5 illustrates a series of 30 one-second calculations for a variety of radiation sources with various shielding configurations. Using the shielding calculation methods described herein, the calculated Mfp is shown. The $\Delta\phi/\phi_0$ is shown to be fairly low for most samples.

TABLE 5

Average values for 30 one-second calculations of
cutoff energy, mean free paths, and $\phi/\phi_0$ for
a variety of sources and shielding configurations
Average Values for 30 Seconds of Real-Time Data

| Source | Activity | True Shielding | True $\phi/\phi_0$ | Cutoff Energy | Calculated Mfp | Calculated $\phi/\phi_0$ | $\Delta(\phi/\phi_0)$ |
|---|---|---|---|---|---|---|---|
| Ba-133 | 1 µCi | none | 1.00 | 433.9 | 0.00 | 1.00 | 0.000 |
| Ba-133 | 14 mCi | 3.11 mfp | 0.37 | 337.0 | 3.21 | 0.36 | 0.004 |
| Co-60 | 1 µCi | none | 1.00 | 1412.0 | 0.00 | 1.00 | 0.000 |
| Co-60 | 1 mCi | none | 1.00 | 1403.2 | 0.00 | 1.00 | 0.000 |
| Co-60 | 1 mCi | 1.8 mfp | 0.51 | 1322.9 | 3.09 | 0.44 | 0.073 |
| Cs-137 | 1 µCi | none | 1.00 | 755.8 | 0.00 | 1.00 | 0.000 |
| Cs-137 | 350 µCi | none | 1.00 | 754.7 | 0.00 | 1.00 | 0.000 |
| Cs-137 | 300 µCi | 2.4 mfp | 0.41 | 627.4 | 2.05 | 0.46 | −0.049 |
| Co-57 | 1 µCi | none | 1.00 | 159.8 | 0.02 | 0.99 | 0.011 |
| Eu-152 | 1 µCi | none | 1.00 | 1436.9 | 2.01 | 0.46 | 0.542 |
| I-129 | 1 µCi | none | 1.00 | 66.3 | 0.00 | 1.00 | 0.000 |
| Mn-54 | 1 µCi | none | 1.00 | 978.0 | 0.00 | 1.00 | 0.000 |
| Na-22 | 1 µCi | none | 1.00 | 1143.1 | 0.00 | 1.00 | 0.000 |
| Np-237 | 10 µCi | none | 1.00 | 465.0 | 1.14 | 0.53 | 0.470 |
| Am-241 | 31 mCi | none | 1.00 | 130.7 | 0.00 | 1.00 | 0.000 |
| U-235 | 80 g | none | 1.00 | 190.9 | 0.15 | 0.91 | 0.089 |

The methods for determining the cutoff energies and attenuation values for shielded and unshielded gamma-ray sources provide a good estimate for the adjustment of the flux values for individual detectors (results generally within 10%). However, the demonstration and assessment of the method in real-time with variable shielding with an integrated system of multiple detectors is a more realistic test of the conditions the system and methods described herein would face in a real-world scenario. A realistic scenario was constructed in the laboratory to test the system.

Figure 12:
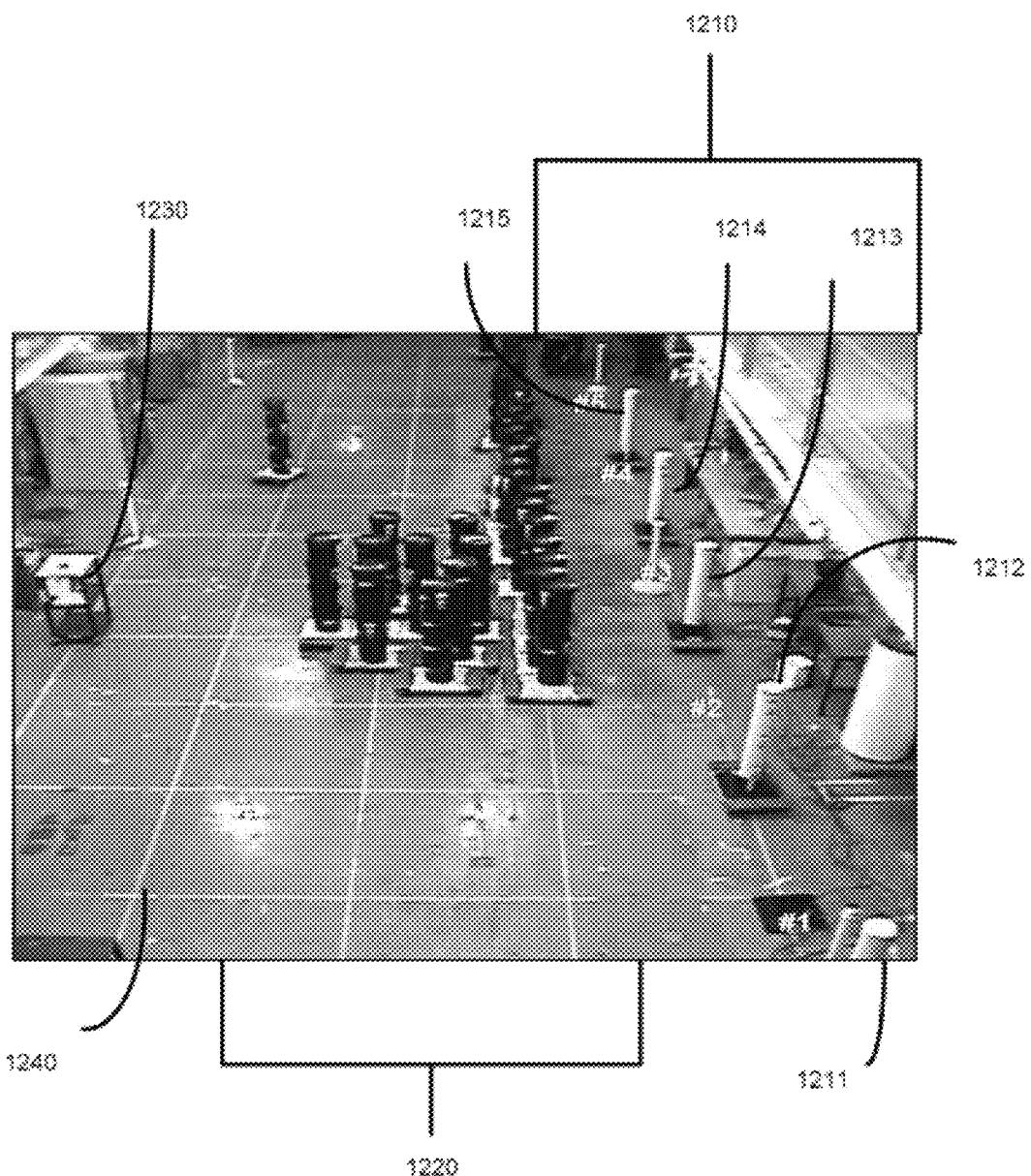
FIG. 12 is a photograph of $^{137}$Cs (on cart, left side) obscured by a shielding configuration simulating a line of people with a small crowd blocking a line of five detectors (white pedestals at right)

FIG. 12 is a photo of the laboratory configuration used in this example. Five 3×12 inch NaI(Tl) detectors 1210 (individual referenced as 1211-1215) were assembled in a line. These mimic a line of pedestrian portals near the entrance to a venue. Shielding phantoms 1220 were placed to mimic a line of people and a larger group of people in the middle of the image. A 750 µCi $^{60}$Co source was positioned on a source cart 1230 as shown in FIG. 12 on the left side. The grid lines 1240 marked on the floor are five foot increments. The shielding between the detectors and the source are: 0 phantoms for detector 1211, 0 phantoms for detector 1212, 4 phantoms for detector 1213, 1 phantom for detector 1214, and 1 phantom for detector 1215. Depending on the source energy, these represent shielding that varies from 0-12 mean free paths. One embodiment of the described shielding model was assessed by comparing the results using the shielding model to account for shielding effects when locating the radiation source to the results with no shielding correction.

Figure 13:
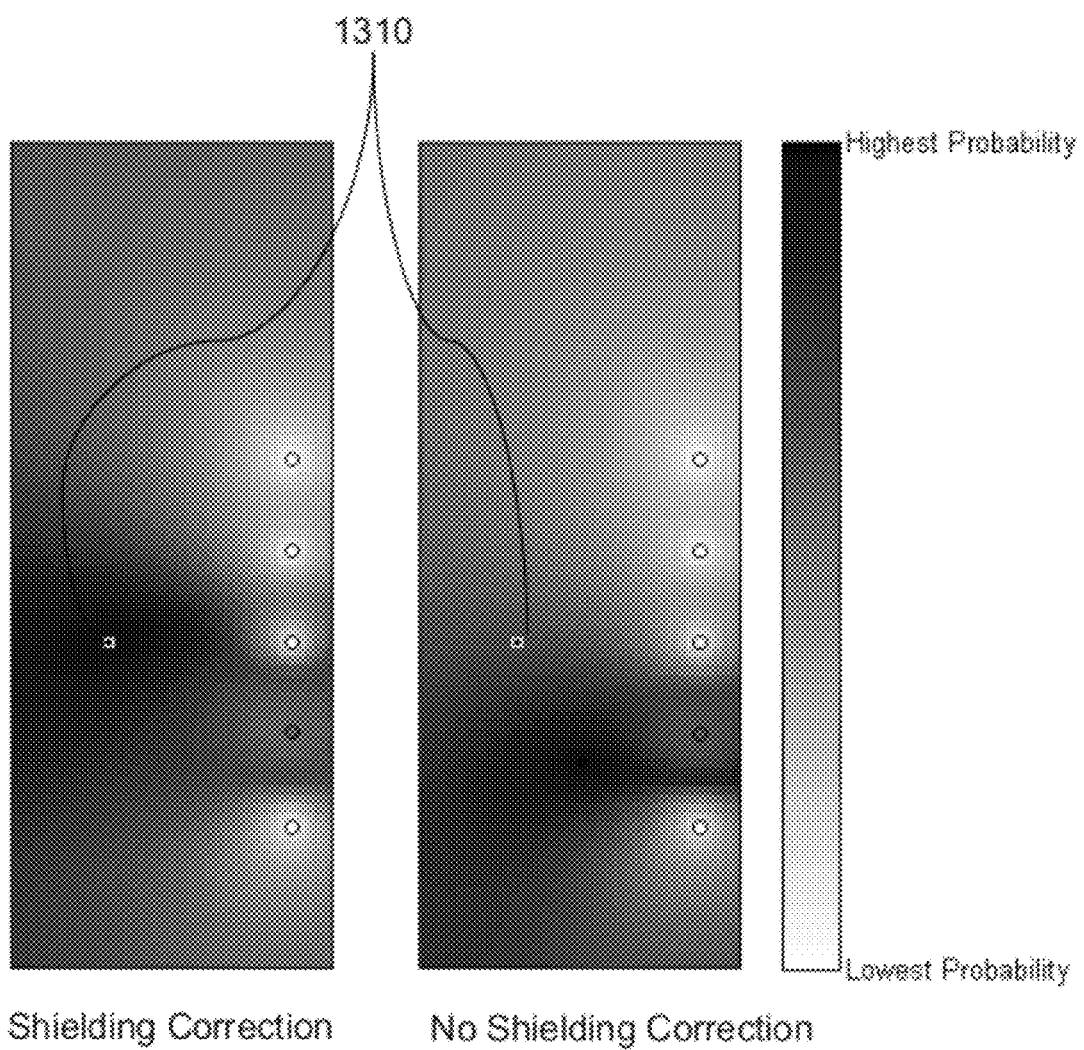
FIG. 13 illustrates probability density function (PDF) maps of the configuration shown in FIG. 12 with the five circular regions on the right indicating the detector locations and a dark region indicating the solution of an embodiment of the system with the shielding determination activated (left) and deactivated (right)

FIG. 13 shows representative probability density function (PDF) maps for the two cases—with the shielding algorithm on and with no shielding correction. In one embodiment, the PDF map is used in the detection system to present a graphical display of the probability of the source location. In one embodiment, the PDF map uses a scale such as from red or dark (highest probability) to blue or light (lowest probability) as well as marking the predicted or estimated source location (the location with the highest probability). For reference purposes, true source location 1310 is also shown in FIG. 13, so that one can get a visual sense of the error in position estimate. With no shielding correction, the predicted source location is 18 feet off of the true source location. The predicted source location is closer to the unshielded detectors as these detectors are registering signals that are appropriate for an unshielded source (since there is no shielding between the source and these two detectors). In addition, the highest probability region (dark region on left portion) is closest to the second detector as this detector had the highest signal (it was the closest unshielded detector to the source). Using the real-time shielding method, the estimated source location is much closer to actual source location. In fact, for the case shown, the estimated position is within one foot of the true location which corresponds to the spatial resolution of the system being used.

Table 6 presents data for the same case for three different sources, $^{137}$Cs, $^{60}$Co, and $^{133}$Ba. The detector system was run for 30 seconds to collect thirty one-second intervals. For each time interval, the system calculated the source position. The distance between the estimated position and the true position was calculated for each interval, and then the average distance and standard deviation were computed. As shown in Table 6, the average distance between the true position and estimated position is significantly reduced for all sources. This shows a significant improvement in the estimated source position.

TABLE 6

Average distance to true source location with shielding algorithm on and off for 30 seconds of data with $^{137}$Cs, $^{60}$Co, and $^{133}$Ba using a distributed array of five detectors in the arrangement shown in FIG. 12

| | Average Net Count Rates | | | | | Algorithm ON | | Algorithm OFF | |
|---|---|---|---|---|---|---|---|---|---|
| | Det #1 | Det #2 | Det #3 | Det #4 | Det #5 | avg($\Delta r$) | $\sigma_r$ | avg($\Delta r$) | $\sigma_r$ |
| $^{137}$Cs | 858 | 1223 | 526 | 532 | 346 | 4.49 | 1.59 | 12.48 | 0.58 |
| $^{60}$Co | 1998 | 3040 | 1382 | 1538 | 1006 | 3.75 | 1.07 | 10.58 | 0.50 |
| $^{133}$Ba | 31264 | 49834 | 18719 | 17185 | 11079 | 3.81 | 1.74 | 12.74 | 0.43 |

The foregoing description of embodiments of the present invention has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A system for the determination of shielding thickness of a dynamically changing shielding, comprising:
   a plurality of distributed radiation detectors;
   a data collection and storage system in communication with the plurality of radiation detectors;
   a computer system in communication with the data storage and collection system, the computer system comprising a processor and a memory unit having instructions stored thereon providing instructions to:
      determine a background count;
      collect count data for a gamma ray spectrum of a radiation source corresponding to each of the plurality of radiation detectors for a predetermined time;
      normalize the collected gamma ray data;
      compute the signal as the difference between the background count and the normalized collected gamma ray data;
      calculate a signal-to-noise ratio using the computed signal;
      identify a portion of the spectrum corresponding to a useful signal based upon the signal-to-noise ratio calculation;
      normalize the identified portion;
      compare the normalized identified portion to a predetermined reference corresponding to a shielded spectra; and
      compute for each of the plurality of radiation detectors a shielding thickness disposed between the radiation source and the respective detector of the plurality of radiation detectors based on an offset between the normalized identified portion and the predetermined reference corresponding to the shielded spectra,
   wherein the normalized collected gamma ray data is adjusted to account for the shielding thickness to improve accuracy of localization and tracking of the radiation source in real-time in a presence of a dynamically changing shielding.

2. The system of claim 1, wherein the computer system further provides instructions to compute a location of the radiation source based on the collected count data and corrected for the computed shielding thickness.

3. The system of claim 2, wherein the location of the radiation source is expressed as a probability of the location in at least two degrees of freedom.

4. The system of claim 1, wherein the predetermined reference is characterized by a universal shielding curve varying in relation to the energy of the radiation source.

5. The system of claim 1, wherein the shielding thickness between the radiation source and the plurality of radiation detectors is spatially heterogeneous.

6. The system of claim 5, wherein the shielding thickness between the radiation source and at least one of the plurality of radiation detectors varies with time.

7. A method for determining a shielding thickness of a dynamically changing shielding between at least one detector and a radiation source, comprising:
   carrying out the following steps using a processor
      determining a background count;
      collecting data for a gamma ray spectrum corresponding to a radiation source for each of the at least one detector for a predetermined time;
      normalizing the collected gamma ray data;
      computing a signal as a difference between the background count and the normalized collected gamma ray data;
      calculating a signal-to-noise ratio using the computed signal;
      identifying a portion of the spectrum corresponding to a useful signal based upon the signal-to-noise ratio calculation;
      normalizing the identified portion;
      calculating an offset between the normalized identified portion and a predetermined universal shielding curve; and computing for the at least one radiation detector a shielding thickness disposed between the radiation source and the at least one radiation detector based on the offset between the normalized identified portion and the predetermined universal shielding curve, wherein the normalized collected gamma ray data is adjusted to account for the shielding thickness to improve accuracy of localization and tracking of the radiation source in real-time in a presence of a dynamically changing shielding.

8. The method of claim 7, further comprising computing, by the processor, a location of the radiation source by applying the computed shielding thickness to the signal.

9. The method of claim 8, wherein the location of the radiation source is expressed as a probability of the location in at least two degrees of freedom.

10. The method of claim 8, wherein the location of the radiation source is determined in real-time.

11. The method of claim 7, wherein the universal shielding curve is characterized by an energy-dependent reference.

12. The method of claim 7, wherein the at least one radiation detector comprises a plurality of radiation detectors.

13. The method of claim 12, wherein the shielding thickness disposed between the radiation source and the plurality of radiation detectors is variable.

14. The method of claim 13, wherein the shielding comprises a plurality of people.

15. A system for determining a location of a radiation source shielded by a dynamically changing shielding, comprising:
a plurality of distributed radiation detectors;
a data collection and storage system in communication with the plurality of radiation detectors;
a computer system in communication with the data storage and collection system, the computer system comprising a processor and a memory unit having instructions stored thereon providing instructions to:
determine a background count;
collect data for a gamma ray spectrum corresponding to the plurality of distributed radiation detectors for a predetermined time;
normalize the collected gamma ray data;
compute the signal as the difference between the background count and the normalized collected gamma ray data;
calculate a signal-to-noise ratio using the computed signal;
identify a portion of the gamma ray spectrum corresponding to a useful signal based upon the signal-to-noise ratio calculation;
adjust the radiation counts by a correction factor to account for a shielding thickness of the shielded radiation source;
process the radiation counts from each of the plurality of distributed radiation detectors to determine a probability density function for the location of the shielded radiation source relative to the plurality of distributed radiation detectors; and
output information indicative of the location of the shielded radiation source relative to the plurality of distributed radiation detectors, wherein the radiation counts are adjusted to account for the shielding thickness of the shielded radiation source to improve accuracy of localization and tracking of the radiation source in real-time in a presence of a dynamically changing shielding.

16. The method of claim 15, wherein the correction factor is derived from a universal shielding curve.

17. The method of claim 15, wherein the gamma ray spectrum is distributed among a plurality of channels associated with each of the plurality of distributed radiation detectors, and wherein the signal-to-noise ratio is applied to define a cutoff channel corresponding to an upper limit of the useful signal.

18. The method of claim 17, further comprising a plurality of channel bins, each of the plurality of channel bins defined by a predetermined number of the plurality of channels, and wherein a cumulative signal-to-noise ratio is applied to channel bins.

19. The method of claim 15, wherein instructions are provided to determine the instantaneous shielding thickness.

20. The method of claim 15, wherein instructions are provided to determine the primary energy of the radiation source.

* * * * *